United States Patent

Vucich et al.

[11] 4,024,742
[45] May 24, 1977

[54] METHOD OF LUBRICATING A COLD REDUCTION MILL

[75] Inventors: Michael G. Vucich, Weirton, W. Va.; Michael X. Vitellas, Steubenville, Ohio

[73] Assignee: National Steel Corporation, Pittsburgh, Pa.

[22] Filed: Sept. 22, 1975

[21] Appl. No.: 615,692

[52] U.S. Cl. ............................................. 72/42
[51] Int. Cl.² ................... B21B 27/10; B21B 45/02
[58] Field of Search ............. 72/41, 42, 43, 44, 45, 72/236; 252/49.5

[56] References Cited

UNITED STATES PATENTS

| | | | |
|---|---|---|---|
| 2,342,199 | 2/1944 | Hurtt | 72/42 |
| 2,632,347 | 3/1953 | Sproule et al. | 72/42 |

FOREIGN PATENTS OR APPLICATIONS

988,073  4/1965  United Kingdom .............. 252/49.5

Primary Examiner—C.W. Lanham
Assistant Examiner—E. M. Combs
Attorney, Agent, or Firm—Shanley, O'Neil and Baker

[57] ABSTRACT

A method for efficiently operating a steel rolling mill employing oil-in-water emulsions as lubricants which includes controlling the stability of the emulsion within certain preselected limits and correlating the oil concentration to a mean time ($\bar{t}_m$) of such values. The mean time is determined through an emulsion stability index test and constitutes the time required for the concentration of oil in emulsion samples to drop to 50% of its original value.

5 Claims, 7 Drawing Figures

FIG. I.

SEMI-LOGARITHMIC PLOT OF ESI DATA OBTAINED ON THE RECIRCULATING LUBRICATION SYSTEM

FIG. 2.

LOG PROBABILITY PLOT OF ESI DATA FROM THE RECIRCULATING LUBRICATION SYSTEM

| DATA | $C_a$ | $\bar{t}_m$ | $\log \bar{t}_m \pm \sigma$ |
|---|---|---|---|
| 3/31 | 8.3 | 8.0 | 0.90 ± 0.56 |
| 4/7 | 6.1 | 3.1 | 0.49 ± 0.60 |
| 4/14 | 4.6 | 1.0 | 0 ± 0.95 |
| 4/21 | 4.3 | 1.45 | 0.16 ± 0.73 |
| 4/28 | 3.4 | 0.95 | −0.02 ± 1.10 |

FIG. 5.

RELATIONSHIP BETWEEN LOG MEAN TIME AND STANDARD DEVIATION FOR THE EMULSION IN THE RECIRCULATING LUBRICATION SYSTEM

FIG. 6.

LOG PROBABILITY PLOT OF ESI DATA FROM THE DIRECT APPLICATION SYSTEM

METHOD OF LUBRICATING A COLD REDUCTION MILL

BACKGROUND OF THE INVENTION

This invention relates generally to the cold-rolling of metals and is concerned with the production of superior quality strip in high yields while reducing the lubrication costs of the rolling operation. More specifically, the invention relates primarily to the operation of steel rolling mills employing oil-in-water emulsions as lubricants and defines a unique method for reducing the consumption of oil in any such system by controlling the stability of the emulsion within preselected limits.

The use of oil-in-water emulsions as lubricants in present-day rolling mills has become quite conventional. The typical emulsion utilized in such an operation comprises an aqueous dispersion of blend of oils, usually mineral oil and natural oils such as tallow (which are essentially esters of glycerol and long chain fatty acids) along with nonionic and/or anionic emulsifying agents. The nature and concentration of oils in any such emulsion will be determined by the frictional and/or lubricity requirements of the process as required by the specifications of the steel involved, the operating conditions, the desired reduction and the final gage. However, in the past the methods for determining optimum oil concentrations have been rather precise, in many cases resulting in an unnecessary and expensive consumption of oil in the operation. It is an object of this invention to diminish such oil loss.

Also in the cold rolling of steel strip, particularly in the production of what is commonly known as double reduced or thin tinplate, it is common to develop numerous problems which can be attributed to a breakdown of the emulsion after an initial period of use. Such problems include the necessity of exceptionally high loads, i.e., pressure, on the rolls, as well as irregular "wetting" of the steel strip and the resulting formation of localized pockets of lubricant which under the hydraulic pressure of the rolls causes surface irregularities and mottling. It is a further object of this invention to substantially overcome these difficulties.

The above objects and others which will become apparent in the ensuing discussion are achieved in the present discovery of a relationship between emulsion stability, oil concentration and plate-out rate of the lubricant.

SUMMARY OF THE INVENTION

According to this invention a steel cold-rolling mill is provided with an oil-in-water emulsion lubricant whose stability, as determined according to a series of emulsion stability index values measured against a geometric progression of time factors, is maintained within preselected limits and correlated with the oil concentration of the emulsion. The most convenient method for determining the optimum relationship between oil concentration and emulsion stability is to establish a mean time for the index values which may then be related to the oil concentration and maintained within preselected limits. In this way the amount of oil consumed in the operation will be decreased yet the lubricity requirements of the mill will be maintained over a significantly extended period of time.

DETAILED DESCRIPTION OF THE PREFERRED EMBODIMENTS

The present invention provides a method for prolonging the service life of an oil-in-water emulsion lubricant in a cold rolling process and provides a standard by which the stability of the emulsion according to a series of emulsion stability index values measured against a geometric progression of time factors may be correlated with the oil concentration in the emulsion and maintained within preselected limits to produce superior quality strip in high yields with a significant reduction in the amount of oil consumed in the rolling opeation.

The stability of the emulsion is measured according to an Emulsion Stability Index (ESI) test conventionally identified as an ASTM 3342–74 procedure. This test is a measure of the rate of separation of the oil and water phases in a quiescent emulsion sample and comprises a procedure which includes preparing 4500 milliliters of emulsion using a 5.8 liter stainless steel beaker with a commerical Porta-Temp unit which agitates, heats and pumps the oil and water phases and converts them into a uniform mixture. The stainless steel beaker has an outlet 1 inch from the bottom of the cell for sampling. The emulsion is mixed by the Porta-Temp for 30 minutes at 135° F. (57° C.), and a sample is taken and the agitation stopped. The quiescent solution is sampled in geometric time intervals, i.e., 0.5, 1, 2, 4, 8, 16 and 32 minutes. The concentration of oil in the emulsion sample, expressed as a volume percent of the original concentration, taken from the outlet at any time interval is called the emulsion stability index (EXI).

According to the above ASTM test, the parameter is the slope of a straight line, fit by the method of least squares, to the base ten logarithmics of both time, in minutes, and the measured concentration in percent. However, in the preferred method of this invention, a nearly linear log probability plot was made to obtain a best straight line fit of the ESI data and the means time ($\bar{t}_m$), i.e., the time required for the concentration to drop to 50 percent of its original value, and the standard deviation ($\sigma$) which is a measure of the rate of change in concentration about the mean. They ae expressed as log $\bar{t}_m \pm \sigma$. Methods for determining a standard deviation ($\sigma$) are well known to those familiar with statistical evaluation but for convenience it may be determined according to the formula:

$$\sigma = \sqrt{\frac{(x_1 - M)^2 + (x_2 - M)^2 + \cdots + (x_n - M)^2}{n}}$$

wherein $x$ is an individual index reading, M is the mean and $n$ is the total number of index readings.

Utilizing these testing and data analysis methods, according to this invention it has been discovered that oil consumption and product quality are determined by the stability and oil concentration of an emulsion which controls the plate-out rate and the uniformity of an oil film on a steel strip. The mean time ($\bar{t}_m$), as defined previously, has been found to be the best measure of emulsion stability. To minimize oil consumption and maintain high product quality on a direct application system, $\bar{t}_m$ should in general range frm 0.25 to 5.5 minutes; preferably 2 to 4 minutes. Recommended operating $\bar{t}_m$ for a recirculating system is 0.5 to 12 minutes. A direct application system is best described as a system where the oil-in-water emulsion and cooling water are applied to the strip separately then discarded after one application. In a recirculating system, copious quantities of an oil-in-water emulsion are recycled from a storage tank to the mill and are used to cool and lubricate the strip. With both types of lubrication system, a specific oil concentration range must be maintaned for each $\bar{t}_m$ to deposit the proper oil film thickness on the strip which will establish proper load conditions on the rolling mill for each type product. Thus, significant savings will be realized in the operation of a direct application system by charging the mill with a lubricant which has a $\bar{t}_m$ within the above indicated range and an oil concentration which is measured against such a standard. The economical operation of a recirculating system, is promoted according to this invention by extending the service life of the emulsion through the periodic addition of emulsifiers to maintain the recommended stbility while correlating the oil concentration so that only the amount required for efficient rolling of the mill is utilized.

A more complete understanding of this invention and the basis for the above conclusions will be realized in the following discussion of specific operations which were performed in double reduction mills utilizing in one case a direct application system and in the other case a recirculating system.

RECIRCULATING LUBRICATION SYSTEM

A double reduction mill operation utilizing a recirculating lubrication system was utilized to determine whether an emulsion system could be regulated to maintain a uniform operating condition for an extended period of time and thus improve product quality, extend the emulsion life and reduce oil consumption below its normal range of 1.2 to 2.5 lb/ton. The emulsion was formulated using a proprietary oil product including 20% mineral oil and 80% tallow (145-150 SAP) with a mixture of nonionic and anionic emulsifiers. Loads on the mill were maintained in the range of 400-600 tons (Stand No. 1) and 240-300 tons (Stand No 2) while production rates averaged 1060 tons/day. The mill operators adjusted oil concentration as necessary to obtain satisfactory operation and reduced the rate at which the emulsion lost stability by skimming and adding emulsifiers. Emulsion samples were collected at least twice every eight hours from the storage tank for the recirculated emulsion and ESI measurements determined according to the procedure previously described. The daily average of the data taken during this operation and other pertinent operating data are set forth below in Table 1. The weekly averages of the ESI data shown in this table are not necessarily the average of the daily readings since an irregular number of readings may have been taken in any one day.

TABLE 1

| Date | | Production Tons | Oil Used Gallons | Oil Conc. Volume % | Emulsifier Liters | ESI - Volume Percent Minutes | | | |
|---|---|---|---|---|---|---|---|---|---|
| | | | | | | 0.5 | 1 | 2 | 4 |
| Start | | | 908 | | | | | | |
| 3/27 | | 1062 | 200 | 8.0 | None | 98.0 | 98.0 | 86 | 74 |
| 3/28 | | 1056 | 250 | 8.0 | None | 98.5 | 98.5 | 90.3 | 81 |
| 3/29 | | 1050 | 150 | 8.8 | None | 97.3 | 93.6 | 80 | 66 |
| 3/30 | | 1002 | 150 | 8.4 | None | 100 | 95.5 | 82 | 65 |
| 3/31 | | 1053 | 0 | mgn | None | — | — | — | — |
| | Avg. | 1045 | 150 | 8.3 | None | 98.5 | 96.4 | 84.4 | 71 |
| 4/3 | | 981 | 74 | 6.2 | 3.0 | 85.5 | 65 | 58 | 44 |
| 4/4 | | 1098 | 82 | 6.1 | 1.0 | 94.5 | 85 | 65 | 48 |
| 4/5 | | 1110 | 56 | 6.3 | 2.5 | 93.0 | 84 | 65 | 46 |
| 4/6 | | 1020 | 51 | 6.1 | 2.5 | 93.8 | 85.7 | 65 | 42 |
| 4/7 | | 1128 | 76 | 5.6 | 2.5 | 90.1 | 77 | 51 | 33 |
| | Avg. | 1068 | 68 | 6.1 | 2.3 | 91.4 | 79 | 61 | 43 |
| 4/10 | | 855 | 95 | 4.4 | 4.0 | 64 | 47 | 34 | 24 |
| 4/11 | | 1080 | 76 | 4.6 | 5.0 | 76 | 54 | 36 | 26 |
| 4/12 | | 1149 | 80 | 4.5 | 6.5 | 81 | 60 | 39 | 28 |
| 4/13 | | 1122 | 108 | 4.4 | 9.2 | 68 | 47 | 36 | 28 |
| 4/14 | | 1074 | 120 | 4.9 | 4.0 | 61 | 43 | 30 | 21 |
| | Avg. | 1071 | 96 | 4.6 | 5.84 | 70 | 50 | 35 | 26 |
| 4/17 | | 780 | 195 | 4.2 | 1.0 | 77 | 60 | 40 | 28 |
| 4/18 | | 1047 | 80 | 4.2 | 1.0 | 77 | 54 | 36 | 29 |
| 4/19 | | 987 | 103 | 4.4 | — | 79 | 60 | 44 | 27 |
| 4/20 | | 927 | 73 | 4.2 | 1.0 | 82 | 62 | 42 | 27 |
| 4/21 | | 1146 | 70 | 4.5 | 1.0 | | | | |
| | Avg. | 978 | 104 | 4.3 | 0.8 | 79 | 60 | 40 | 27 |
| 4/24 | | 1062 | 125 | 3.4 | 1.5 | 82 | 67 | 43 | 34 |
| 4/25 | | 1170 | 105 | 3.5 | 0 | 69 | 50 | 36 | 29 |
| 4/26 | | 1113 | 120 | 3.3 | 1.0 | 60 | 45 | 37 | 27 |

TABLE 1-continued

| Date | Production Tons | Oil Used Gallons | Oil Conc. Volume % | Emulsifier Liters | ESI - Volume Percent Minutes | | | |
|---|---|---|---|---|---|---|---|---|
| | | | | | 0.5 | 1 | 2 | 4 |
| 4/27 | 1080 | 87 | 3.3 | 0 | 62 | 45 | 37 | 28 |
| 4/28 | 1266 | 80 | 3.4 | 2.5 | 63 | 42 | 33 | 24 |
| Avg. | 1140 | 103 | 3.4 | 1.0 | 67 | 50 | 37 | 28 |

Figure 1:
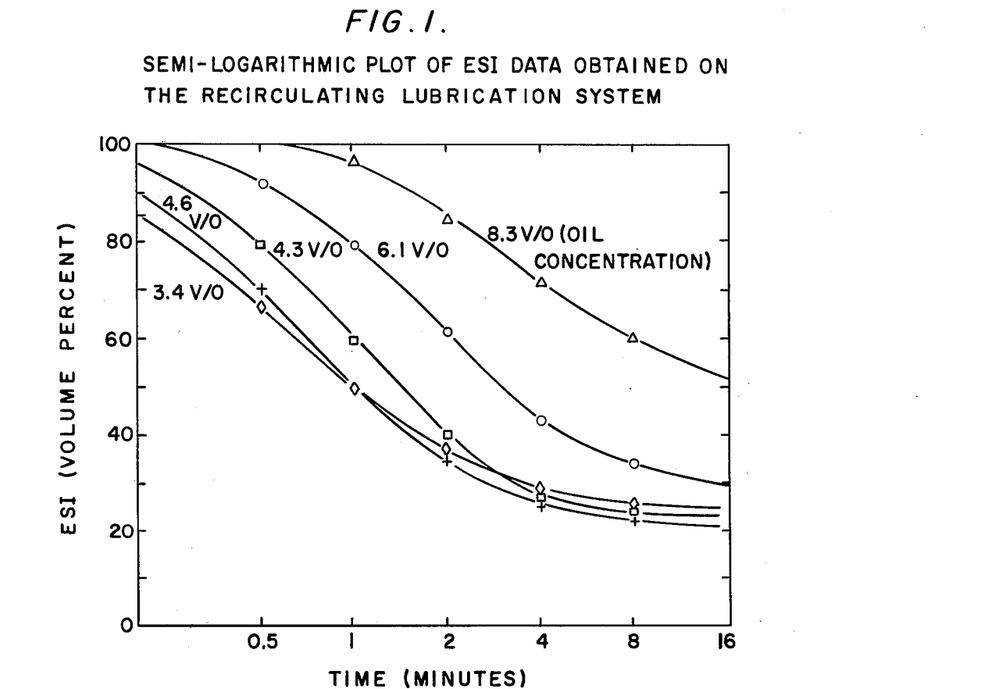
FIG. 1 is a graph depicting a semi-logarithmic plot of emulsion stability index (ESI) data obtained on a recirculating lubrication system.

A semilogarithmic plot of the average ESI data of Table 1 on a weekly basis is shown in FIG. 1. The relative positions of the curves shown in this figure correspond roughly to the average concentration of oil ($C_a$) in the emulsion, that is, as the stability decreased (i.e., curve moved to the left), a lower concentration of oil was requied to maintain the desired load conditions on the mill. The large additions of oil shown in the above data, i.e., totaling 50 to 250 gallons were made when the loads (screw pressure) on the mill were too high. During subsequent weeks oil additions were made on the basis of production rates. The additions varied from 0.50 to 0.615 lb/ton every 1.5 hours depending on whether the concentration was increasing or decreasing. Emulsifier was added when the emulsion stability test readings were less than 90 at 1 minute but this did not occur until the second week of operation. The large oil additions made in the first week generally restored any loss in stability that might have occurred and emulsion stability was high during this period. However during the second week when small uniform oil additions were being made, the addition of emulsifier was required in order to maintain stability.

Figure 2:
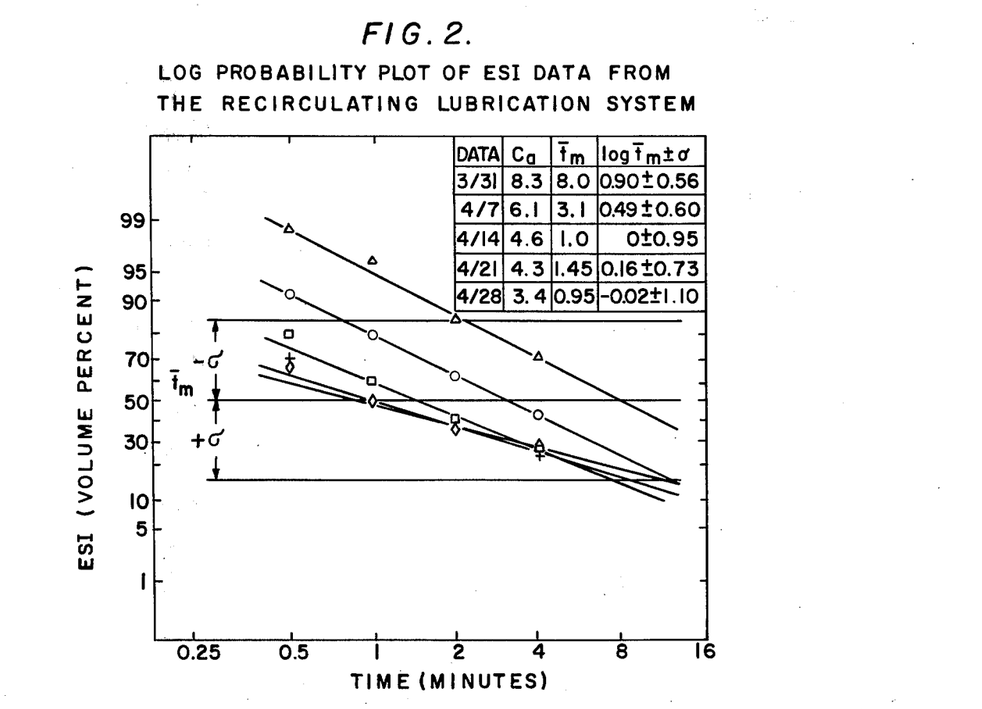
FIG. 2 is a log probability plot of ESI data from the recirculating lubricating system.
Figure 3:
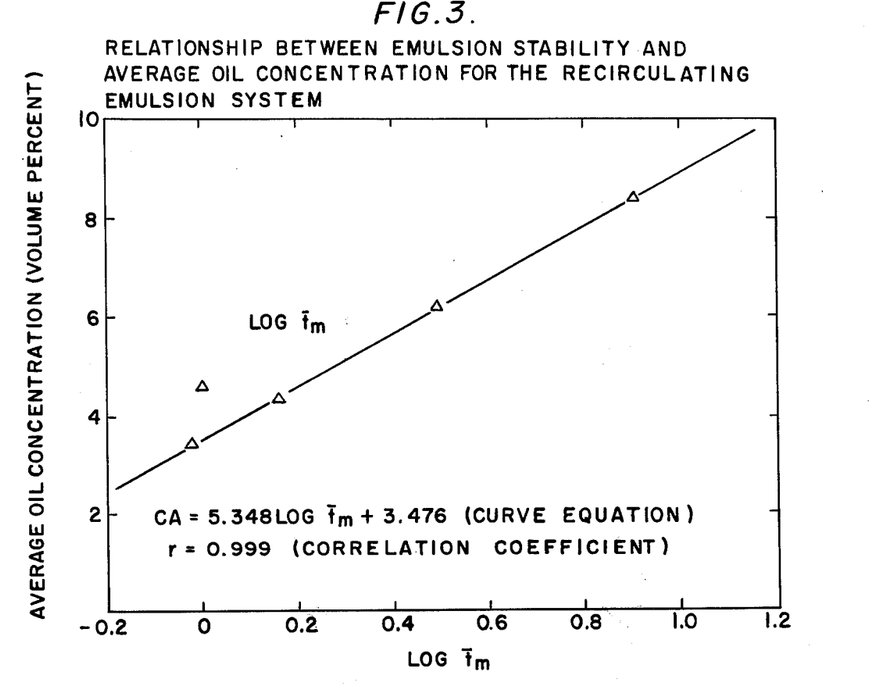
FIG. 3 is a graph on which the log mean time values taken from FIG. 2 are plotted against oil concentration in a recirculating oil emulsion system.
Figure 4:
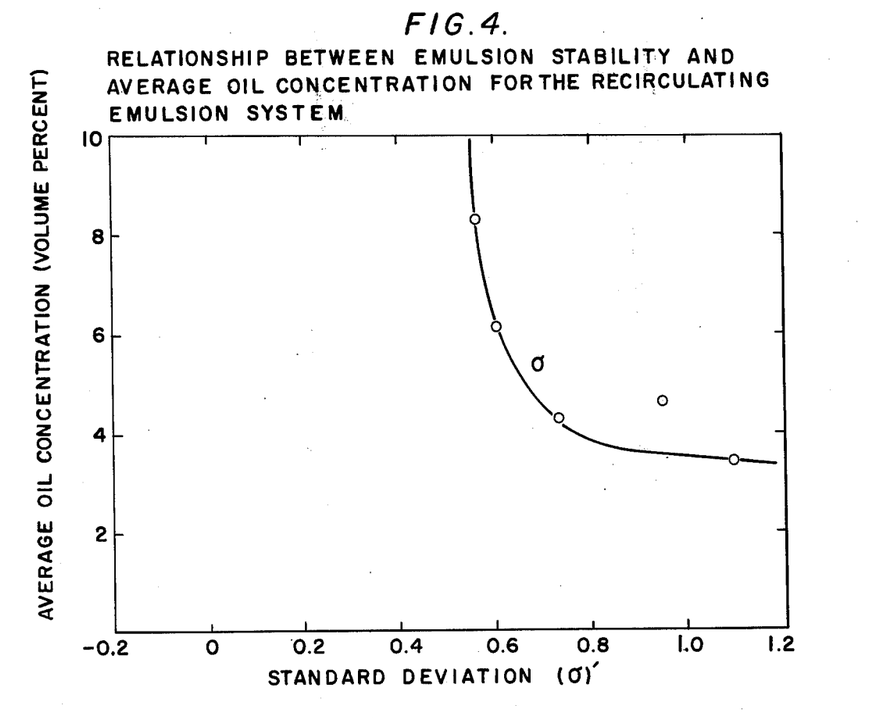
FIG. 4 is a graph depicting the relationship between standard deviation values of a recirculating emulsion system as plotted against oil concentration of that system.
Figure 5:
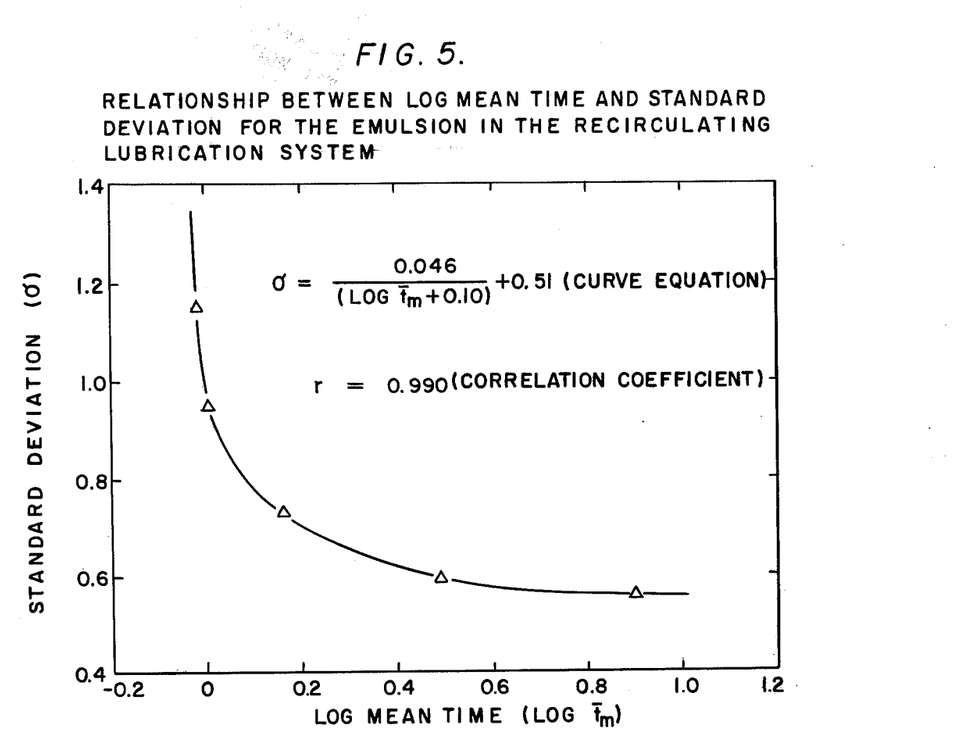
FIG. 5 is a graph depicting an inverse relationship between the log mean time and standard deviation of a recirculating emulsion system.

A log probability plot of the ESI data shown in the semi-logarithmic plot of FIG. 1 is shown in FIG. 2. The most important ESI mesurements for these mills were those taken in the first 4 minutes of each ESI evaluation and these were the only measurements used to plot the straight lines. The log $\bar{t}_m$ values were taken from FIG. 2 and plotted versus oil concentration ($C_a$) as shown in FIG. 3. The standard deviation ($\sigma$) values were also plotted against oil concentration as shown in FIG. 4. It will be apparent from this data that in order to maintain proper loads on the mill it was necessary to allow the oil concentration to decrease as the stability of the emulsion decreased. This is illustrated in FIG. 3 which clearly shows that there is a relationship between log $\bar{t}_m$ and oil concentration and that this relationship can be used to explain the need for larger emulsifier additions during the third week of the run. That is to say at a mean time ($\bar{t}_m$) of 1 minute the oil concentration was 4.6 instead of 3.5% as required by the mill. Attempts to increase the emulsion stability were not successful and the oil concentration should have been permitted to decrease. The rapid increase in standard deviation at low oil concentrations shown in FIG. 4 clearly suggests that this emulsion system would not function properly at much less than about 2% oil, i.e., mottling and roll chatter would be expected due to the inability to lubricate the strip and mill uniformly. FIG. 5 shows an inverse relationship between the log $\bar{t}_m$ and standard deviation ($\sigma$) suggesting that if standard deviation could be reduced for very low ($\bar{t}_m$) values it may be possible to roll at extremely low oil concentration and still deposit the amount of oil film required for proper lubricity.

DIRECT APPLICATION LUBRICATION SYSTEM

A series of trials were run on a double reduction mill utilizing mill loads of 300-600 tons on Stand No. 1 and a direct application system including an emulsion compulsion comprising 90-95% tallow, the remainder mineral oil and a nonionic emulsifier. The ability to cold reduce a variety of products at different reductions by changing the oil concentration is one of the primary advantages of this type of system. This study of the direct application system began when a new shipment of oil was placed on the mill and oil consumption increased from 6 to 12 lb/ton. In addition to requiring a high oil concentration in the emulsion to roll on the mill, excessive loads were required to cold reduce the product that condition could not be overcome by doubling the normal oil concentration to 15%. In the trial discussed below the mill was permitted to operate without restriction and the mill operators were permitted to determine the oil concentration required for satisfactory rolling. The data resulting from four runs in this trial are tabulated below in Table 2 which indicates the effect of emulsion stability on mill loads, speed, oil concentration, and the amount of oil consumed.

TABLE 2

| Run Number | 1 | 2 | 3 | 4 |
|---|---|---|---|---|
| Type Anneal | CA | CA | BA | CA |
| Product Width-in. | 33 5/8 | 32 13/16 | 34 ¾ | 34 11/16 |
| Product Gage-in. | .0062 | .0098 | .0062 | .0109 |
| Percent Reduction | 25 | 40 | 35 | 40 |
| Loads No. 1 Stand-Tons | 530 | 400 | | 460 |
| Exit Mill Speed - fpm | 4500 | 4500 | | 3500 |
| Emulsion -pH | 6.7 | 6.0 | 6.5 | 7.3 |
| -% Oil | 11.0 | 5.6 | 7.4 | 16.8 |
| Emulsion ESI | | | | |
| 0.5 min. | 100 | 61 | 92 | 33 |
| 1 min. | 100 | 46 | 83 | 23 |
| 2 min. | 100 | 43 | 68 | 15 |
| 4 min. | 99 | 32 | 46 | 12 |
| 8 min. | 99 | 32 | 38 | 10 |
| 16 min. | 98 | 32 | 27 | |
| Tons Steel Rolled | 1005 | 807 | 1062 | 1083 |
| Gallons Oil Used | 1292 | 723 | 893 | 1472 |
| Gal. Oil/Ton Steel | 1.285 | 0.89 | 0.65 | 1.359 |

It will be noted that during Run No. 1 the oil concentration in the emulsion which was very stabel (ESI of 99 at 8 minutes) had to be maintained at 11% for steel which is normally run at low loads, 300 ton pressure, on the No. 1 stand instead of the 530 ton recorded that day. During Run No. 2 with an emulsion of moderate to low stability (ESI of 61 at 0.5 minutes) the oil concentration was reduced to 5.6% for steel more difficult to cold reduce and oil usage dropped from 1.285 to 0.89 gallon/ton (9.64 to 6.6 lb/ton). However a loose emulsion (ESI of 33 at 0.5 minute) was used as during Run No. 4, oil consumption increased to 1.359 gallon/ton (10.2 lb/ton) and the mill had to be run at reduced speed for the hard to roll products. This clearly illustrates that there is an optimum intermediate range of stability for the emulsion system of this mill.

In order to confirm the results indicated in Table 2 data was collected over a 2 month test period in which the ESI of the lubricating system was determined on a daily basis when the mill was in operaton. This data is tabulated below in Table 3 and clearly indicates that there is an optimum ESI range which must be maintained to minimize oil consumption and roll well. For convenience sake the tabulation is presented as four groups, Group 1 including those emulsions with a high stability and correspondingly high oil consumption; Group 2 showing emulsions of moderate stability with low oil consmption values; Group 3 showing low oil stability and again high oil consumption; and Group 4 showing extremely low stability in which mottling occurred.

TABLE 3

Group 1
(High Emulsion Stability/High Oil Consumption)

| Date | Oil Used Gal./Ton | ESI/time (minutes) | | | | | |
|---|---|---|---|---|---|---|---|
| | | 0.5 | 1 | 2 | 4 | 8 | 16 |
| 7/19 | 1.28 | 100 | 100 | 100 | 99 | 99 | 98 |
| 6/22 | 1.50 | 100 | 100 | 99 | 98 | 98 | — |
| 6/15 | 0.88 | 100 | 100 | 98 | 98 | 96 | — |
| 8/11 | 1.01 | 100 | 100 | 97 | 97 | 95 | 84 |
| 7/20 | 1.17 | 100 | 100 | 99 | 99 | 94 | — |
| 7/24 | 1.04 | 100 | 100 | 97 | 97 | 91 | 76 |
| 7/30 | 1.21 | 100 | 97 | 94 | 91 | 88 | 77 |
| 8/6 | 0.87 | 96 | 94 | 94 | 90 | 88 | 87 |
| 7/26 | 0.85 | 100 | 100 | 100 | 97 | 86 | 63 |
| 8/2 | 1.21 | 100 | 98 | 97 | 88 | 85 | — |
| 7/31 | 1.01 | 100 | 100 | 100 | 90 | 80 | 72 |
| 8/1 | 1.46 | 100 | 100 | 96 | 92 | 83 | 70 |
| 8/7 | 1.04 | 98 | 94 | 94 | 88 | 78 | 63 |
| 8/3 | 1.09 | 96 | 96 | 93 | 87 | 76 | 65 |
| 8/20 | 1.14 | 98 | 96 | 93 | 82 | 76 | 64 |
| 8/16 | 1.12 | 96 | 93 | 91 | 85 | 74 | 63 |
| 8/10 | 1.03 | 100 | 100 | 95 | 91 | 73 | 50 |
| 8/21 | 1.05 | 100 | 100 | 100 | 94 | 72 | 50 |
| 8/13 | 1.64 | 99 | 95 | 92 | 81 | 68 | 59 |
| 8/15 | 1.10 | 97 | 95 | 92 | 83 | 68 | 58 |
| 8/17 | 1.04 | 100 | 93 | 86 | 74 | 60 | 40 |

Group 2
(Moderate Emulsion Stability/Low Oil Consumption)

| Date | Oil Used Gal./Ton | ESI/time (minutes) | | | | | |
|---|---|---|---|---|---|---|---|
| | | 0.5 | 1 | 2 | 4 | 8 | 16 |
| 8/22 | 0.74 | 96 | 81 | — | 52 | 43 | 29 |
| 8/27 | 0.70 | 95 | 88 | 72 | 56 | 40 | — |
| 7/24 | 0.65 | 92 | 83 | 68 | 46 | 38 | 27 |
| 8/24 | 0.61 | 85 | 77 | 61 | 46 | 46 | 38 |
| 9/6 | 0.52 | 83 | 75 | 58 | 50 | 41 | 20 |
| 8/28 | 0.71 | 83 | 69 | 55 | 41 | 34 | 34 |
| 9/12 | 0.66 | 80 | 60 | 52 | 44 | 40 | — |
| 8/23 | 0.65 | 78 | 56 | 37 | 28 | 25 | 22 |
| 9/11 | 0.80 | 73 | 68 | 54 | 45 | 41 | 30 |
| 9/7 | 0.79 | 72 | 60 | 42 | 33 | 27 | — |
| 9/4 | 0.71 | 71 | 55 | 34 | 17 | 17 | 17 |
| 7/23 | 0.90 | 61 | 46 | 43 | 32 | 32 | 32 |
| 7/25 | 0.87 | 53 | 50 | 39 | 33 | 30 | 30 |
| 8/31 | 0.62 | 48 | 31 | 20 | 14 | 14 | 14 |
| 8/30 | 0.63 | 37 | 26 | 23 | 21 | 21 | 21 |

Group 3

TABLE 3-continued

| Date | (Low Oil Stability/High Oil Consumption) | | | | | |
|---|---|---|---|---|---|---|
| | Oil Used Gal./Ton | ESI/time (minutes) | | | | |
| | | 0.5 | 1 | 2 | 4 | 8 | 16 |
| 8/8 | 1.36 | 33 | 23 | 15 | 12 | 10 | — |
| 8/9 | 1.15 | 19 | 14 | 8 | 8 | 8 | 7 |

Group 4
(Extremely Low Stability/Mottling)

| Date | Oil Used Gal./Ton | ESI/time (minutes) | | | | | |
|---|---|---|---|---|---|---|---|
| | | 0.5 | 1 | 2 | 4 | 8 | 16 |
| 1/18 | Standard Water Hardness Laboratory Test | 20 | 17 | 14 | 14 | 14 | 14 |

Figure 6:
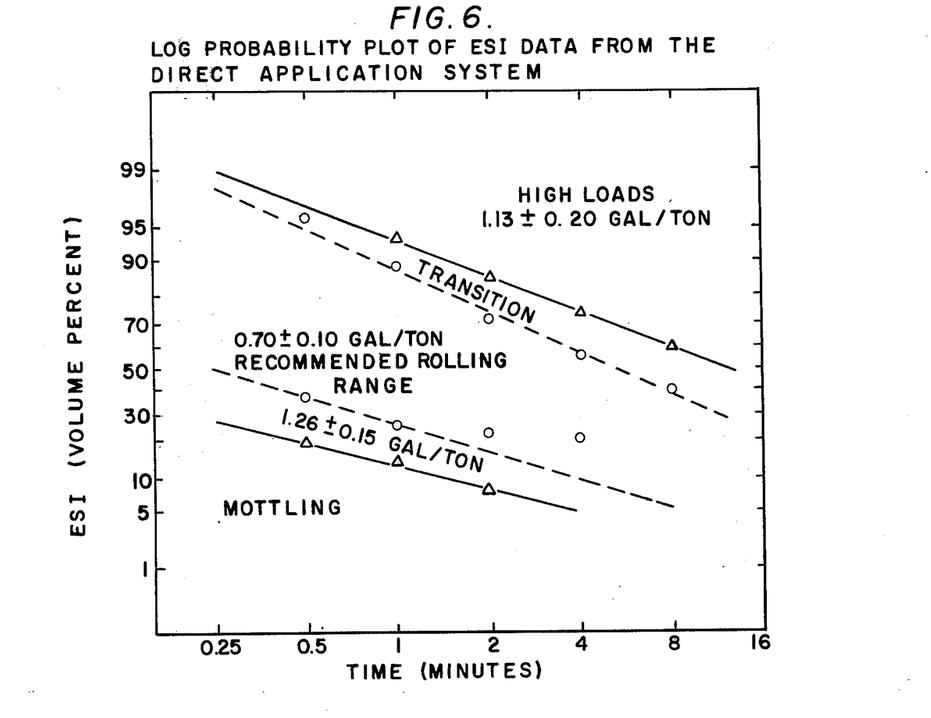
FIG. 6 is a graph depicting a log probability plot of ESI data from the direct application lubrication system.

The data which define the limits of the Groups 1–4 are displayed on the log probability plot in FIG. 6. At a mean time of 12 minutes or greater, the mean oil consumption was 1.13 ± 0.20 gal/ton and extremely high emulsion stabilities caused high loads which could not be corrected by increasing the concentration of oil in the emulsion to acceptable limits. There was a range of mean times, from 5.5 to 12 minutes, for which there was no specific data. This was found to be an acccepta­ble range for the recirculating lubrication system, but it would be expected to be a transition range of increasng oil consumption for the direct application system. The preferred mean time range was 0.25 to 5.5 minutes or, as log $\bar{t}_m \pm \sigma$—0.60 ≅ 0.95 to 0.74 ± 0.64. Oil consumption was 0.70 ± 0.10 gal/ton. Below a mean time of 0.25 minute, oil consumption increased to 1.26 ± 0.15 gal/ton. Laboratory tests with oil which produced mottling on the mill show the occurrence of mottling is related to a set of conditions, i.e., a low mean time, a large standard deviation and high oil concentration.

Figure 7:
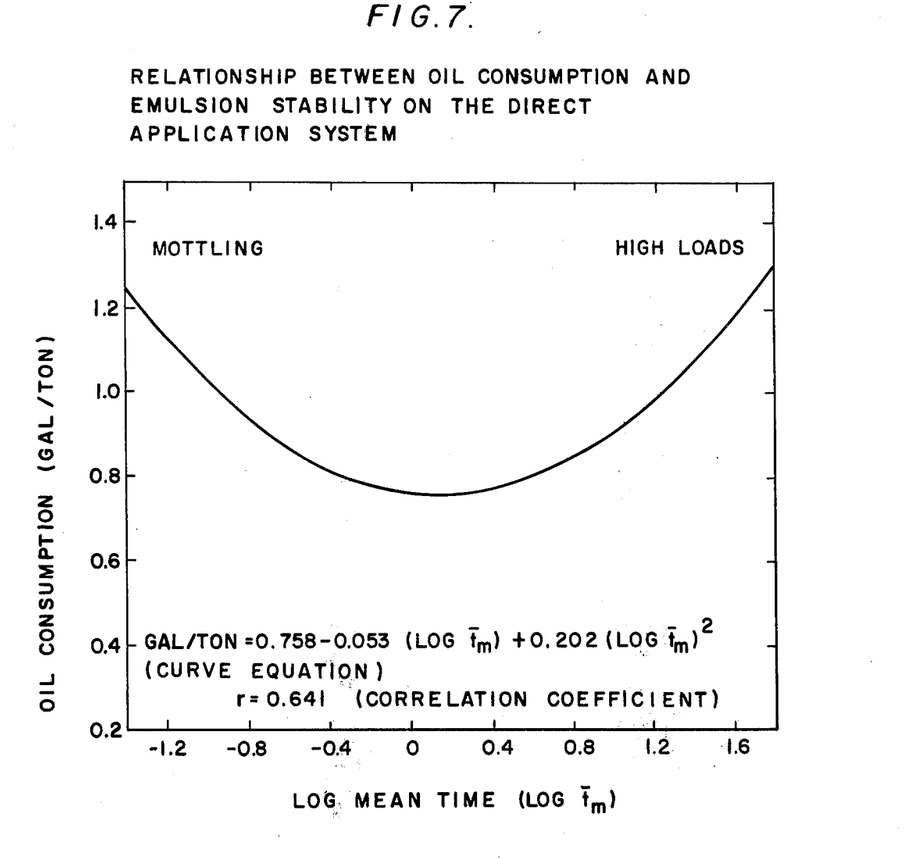
FIG. 7 is a graph depicting the relationship between oil consumption and emulsion stability in a direct application lubrication system.

A plot of the oil consumption rates versus log mean time measured form the data in Table 3 is shown in FIG. 7. A parabola was fit to the data by the least squares method. The curve designates a minimum oil consumption at a mean time of approximately 1.4 minutes. This is consistent with the mill experience subsequent to the trial. The preferred mean time range for good shape and low oil consumpton is 2 to 4 minutes. Other relations besides parabolic were studied but a better correlation coefficient could not be determined.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

We claim:
1. A method of controlling the operation of a steel strip rolling mill comprising charging the mill with an oil-in-water emulsion lubricant, testing the stability of the emulsion as determined by a progression of emulsion stability index values treating the emulsion to maintain its stability within a preselected range of said index values and correlating the oil concentration in the emulsion with said range of index values.

2. The method of claim 1 wherein the charging of said lubricant is effected by a direct application thereof to the steel strip, and discarding the lubricant after its use in the mill 3. The method of claim 2 wherein the emulsion stability index values are plotted against time increments to establish a mean time which is to be mantained within the range 0.25 to 5.5 minutes.

4. The method as defined in claim 1 wherein the charging of said lubricant is effected by a direct application thereof to the steel strip, and thereafter recycling said lubricant from a storage means for reapplication to said strip, said testing of the lubricant being performed periodically over the term of its use in the mill.

5. The method of claim 4 wherein the emulsion stability index values are plotted against time increments to establish a mean time which is maintained within the range of 0.5 to 12 minutes.

* * * * *

UNITED STATES PATENT OFFICE
CERTIFICATE OF CORRECTION

Patent No. 4,024,742      Dated May 24, 1977

Inventor(s) M.G. Vucich, M.X. Vitellas

It is certified that error appears in the above-identified patent and that said Letters Patent are hereby corrected as shown below:

Column 1, line 19, after first "of" insert --a--.

Column 1, line 30, "precise" should be --imprecise--.

Column 2, line 56, "(EXI)" should be --(ESI)--.

Column 2, line 62, "means" should be --mean--.

Column 2, line 67, "ae" should be --are--.

The formula in Column 3 should read as follows:

$$\sigma = \sqrt{\frac{(x_1-M)^2 + (x_2-M)^2 + \ldots + (x_n-M)^2}{n}}$$

Table 1 under Oil Conc. Volume % date 3/31 "mgn" should be deleted.

UNITED STATES PATENT OFFICE
CERTIFICATE OF CORRECTION

Patent No. 4,024,742    Dated May 24, 1977

Inventor(s) M.G. Vucich, M.X. Vitellas

It is certified that error appears in the above-identified patent and that said Letters Patent are hereby corrected as shown below:

Table 2 - first portion should read as follows:

| TABLE 2 | | | | |
|---|---|---|---|---|
| Run Number | 1 | 2 | 3 | 4 |
| Type Anneal | CA | CA | BA | CA |
| Product Width -in. | 33 5/8 | 32 13/16 | 34 3/4 | 34 11/16 |

Column 7, line 2, "stabel" should be --stable--.

Column 8, line 26, "increasng" should be --increasing--.

Column 8, line 29, "$\underline{\phantom{x}}$" should be --$\overset{+}{\underline{\phantom{x}}}$--.

Column 8, line 37, "form" should be --from--.

Signed and Sealed this twenty-third Day of August 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,024,742

DATED : May 24, 1977

INVENTOR(S) : Michael G. Vucich and Michael X. Vitellas

It is certified that error appears in the above-identified patent and that said Letters Patent are hereby corrected as shown below:

Column 6, line 42, after "product" insert -- and --.

Column 8, line 61, after "values" insert a comma.

Signed and Sealed this

Eleventh Day of December 1979

[SEAL]

Attest:

SIDNEY A. DIAMOND

Attesting Officer

Commissioner of Patents and Trademarks